Feb. 3, 1953   N. CORDIS   2,627,336
FEEDING APPARATUS
Filed Aug. 14, 1947   2 SHEETS—SHEET 1
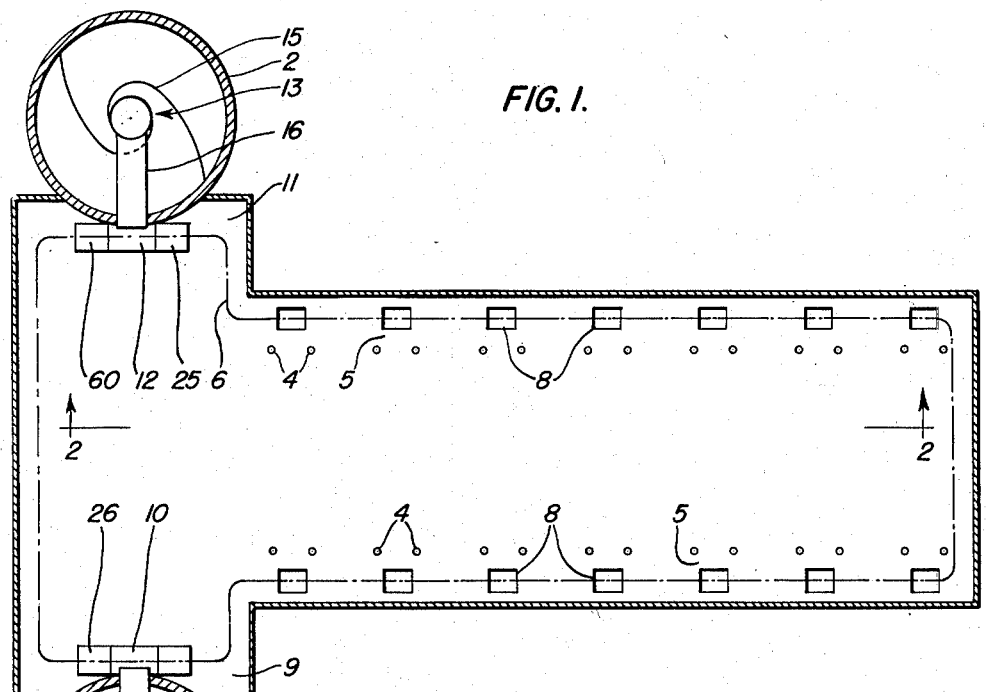
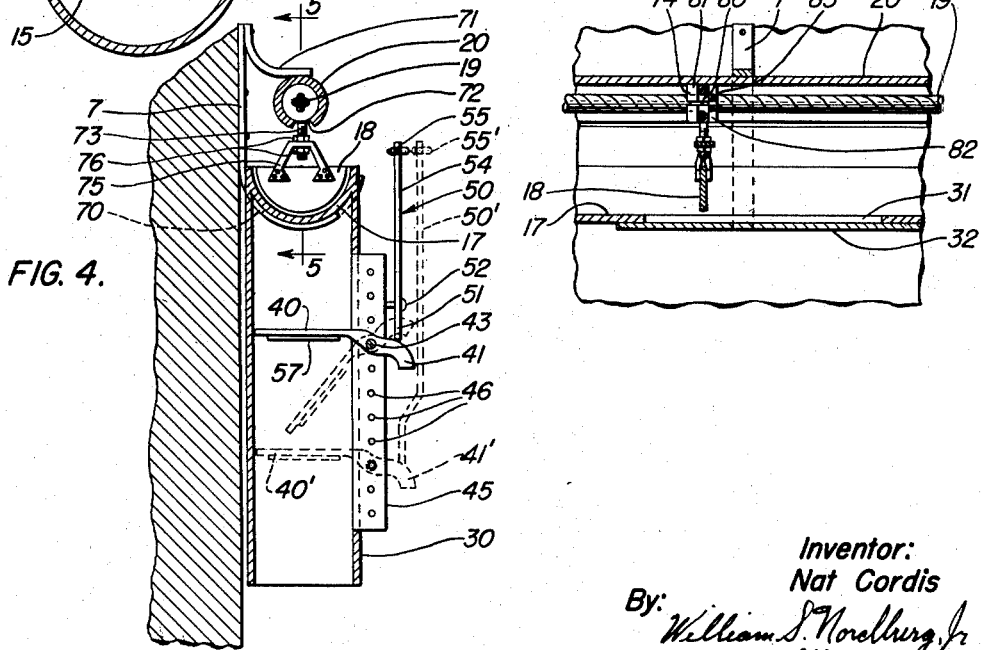
Inventor:
Nat Cordis
By: William S. Nordberg, Jr.
Attorney Feb. 3, 1953     N. CORDIS     2,627,336
FEEDING APPARATUS
Filed Aug. 14, 1947     2 SHEETS—SHEET 2
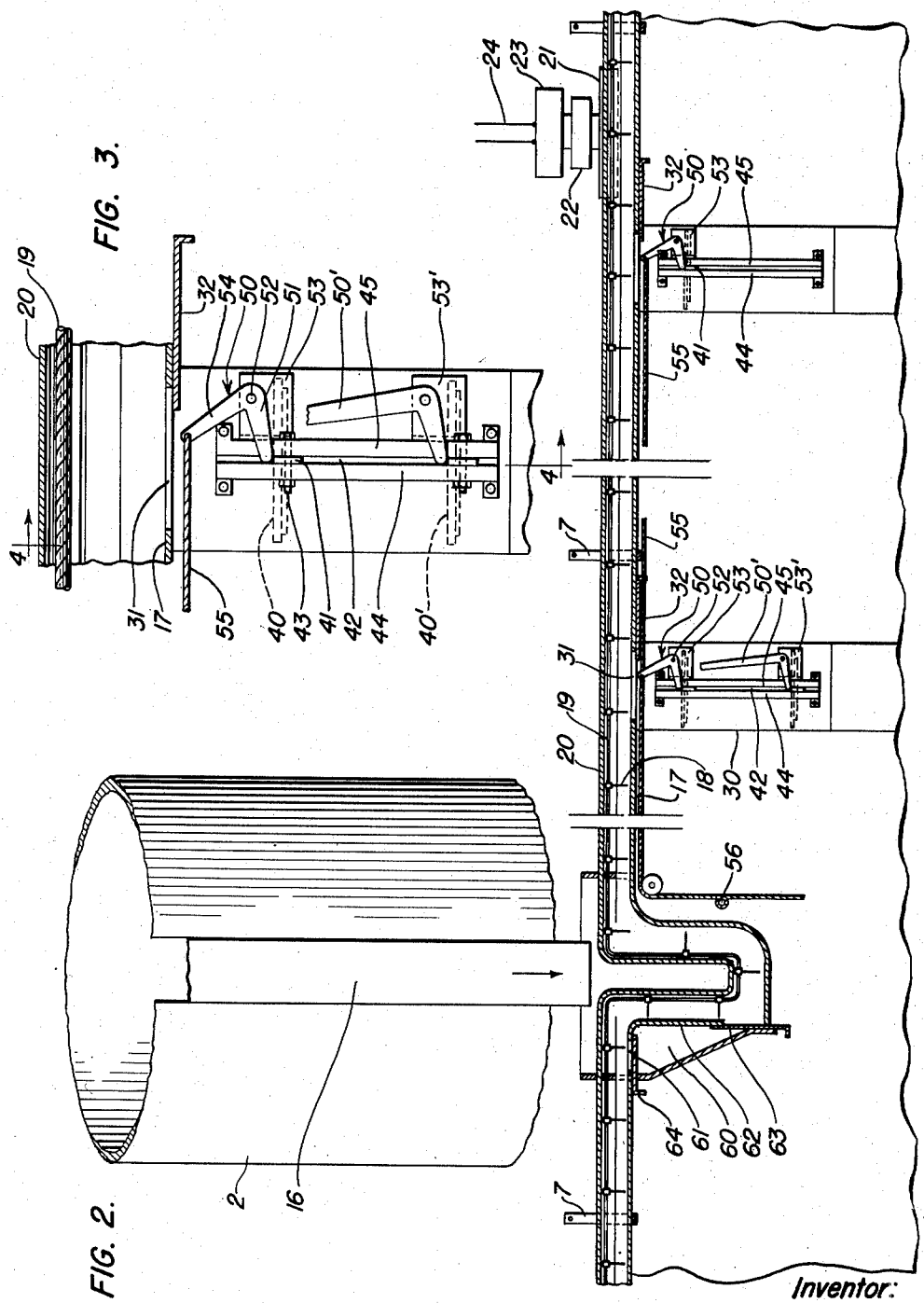
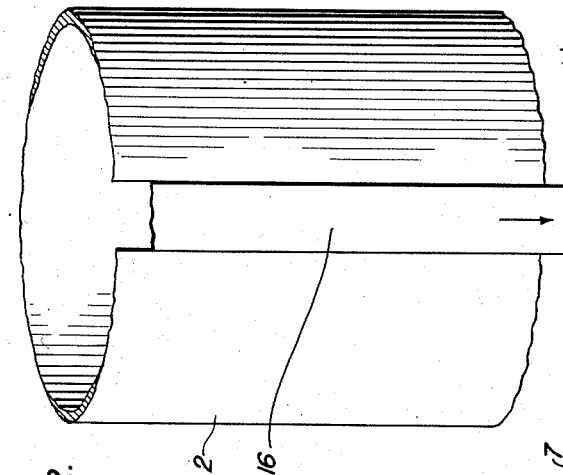
Inventor:
Nat Cordis
By: William S. Nordberg Jr.
Attorney Patented Feb. 3, 1953

2,627,336

UNITED STATES PATENT OFFICE 2,627,336

FEEDING APPARATUS

Nat Cordis, Bassett, Wis.

Application August 14, 1947, Serial No. 768,649

3 Claims. (Cl. 198—48)

This invention relates generally to a mechanical system and apparatus for distributing feed to animals, poultry, and the like, and more particularly to apparatus including a conveyor which distributes one or more kinds of feed from one or more sources to a plurality of feeding stations.

Many types of arrangements have been provided for mechanically distributing feed to chickens, horses, cows, and the like, at their individual perches or stalls. In the main, these arrangements have included a conveyor operating in a trough in which a plurality of openings are provided to permit the feed to be discharged through a suitable chute, which may include a measure box, to a feed box or directly to the manger. The conveyor systems, however, which have been used are the over and under or reciprocating types with no suitable provision being made for returning of excess feed to the source, nor for cleaning the conveyor of one type of feed in order to distribute a second type of feed.

It is, therefore, an object of this invention to provide an improved system and apparatus for distributing feed wherein more than one type of feed can be handled, measured, and delivered to individual stalls and wherein excess feed is returned to the source and is there discharged for use again. It is a further object of this invention to provide apparatus wherein measured amounts of one or more types of feed is discharged from the conveyor at each of a plurality of stations, and wherein, after discharge, the conveyor and each of the stations is prepared to receive another delivery of still a different type of feed for measurement and discharge.

Other objects and advantages will be apparent in the following description of my invention and by reference to the attached drawings forming a part hereof, wherein like numerals refer to the same or identical parts in the various figures and wherein:

Fig. 1 is a schematic plan view of a dairy barn equipped with my improved system and apparatus.

Fig. 2 is a view taken along the line 2—2 of Fig. 1 showing a portion of my apparatus in front elevation with parts broken away.

Fig. 3 is an enlarged view in front elevation of one of my improved discharge stations with parts broken away.

Fig. 4 is a vertical section taken along line 4—4 of Fig. 3.

Fig. 5 is a vertical section taken along the line 5—5 of Fig. 4.

Briefly my invention comprises in combination, a continuous conveyor and means for supplying feed to said conveyor including a plurality of silos having mechanical dispensers therein for delivering feed to a plurality of hoppers associated with said conveyor. A plurality of discharge stations are associated with said conveyor whereby feed in the conveyor is discharged therefrom. Excess feed from one hopper is removed from the conveyor before introducing another kind of feed.

My improved system may be applied to a dairy barn of suitable floor plan equipped with silos 2 and 3 and a plurality of stanchions 4 arranged along each side of the central portion of the barn for the cows. Adjacent the stanchions are the mangers 5. Represented schematically by the broken line is my improved conveyor 6 which is preferably supported along the wall of the barn by wall brackets 7 (Fig. 2). The conveyor passes adjacent the manger 5 on one side of the barn in communication with a plurality of feeding stations 8, thence across to the other side where it passes adjacent the other manger. It then passes into a silo room 9 of silo 3 beneath the downspout 10 of the silo, thence across the other end of the barn into silo room 11 of silo 2 beneath the downspout 12.

In each of the silos there is shown by representation electrically operated mechanical feed dispensers 13 and 14 which may be of many various types, but preferably of the type including a plurality of scrapers 15 for gathering the feed to a point where it is ejected by a suitable conveyor 16 into the downspout and thence into the conveyor.

The conveyor 6 generally comprises a trough 17 through which a plurality of paddles 18 are moved by a continuous cable or cord 19 to which the paddles are secured. The cable 19 is confined in a housing 20 supported above the trough and may be driven in a manner well-known in the art, such as by a sprocket 21 connected through suitable gear mechanism 22 to an electric motor 23. The motor may be controlled by any customary switching means (not shown) connected to wiring 24 preferably located in one of the silo rooms. Silage or other feed is introduced into the trough from hoppers 25 and 26 beneath each of the downspouts and is carried by the paddles to the feeding stations 8.

The feeding stations comprise chutes 30 which are preferably made of sheet metal and are secured to the bottom of the trough, which is also sheet metal, by any suitable means. Communication with the trough from any one of the chutes is provided through an opening 31. A slide valve 32 is provided for the opening so as to place a station in or out of operation at will.

In order to measure the amount of feed that is to be discharged at each of the stations, and to fill each of the stations without having to manually set slide valves when enough feed has been discharged, I provide within each of the chutes 30 suitable mechanism which permits the dumping of each of the chutes, either by manually operated control or by means actuated by the conveyor. This mechanism may take various forms, but preferably for any one feeding station it comprises a plate 40 having a shape conforming to the horizontal section of the chute and of such a size as to permit it to swing downwardly from a horizontal position therein. To effect the downward swinging, the plate 40 is provided with an arm 41 which extends through a longitudinal slot 42 in the outside front face of the chute. The slot is sufficiently narrow to prevent leakage of feed. The arm 41 is pivotally supported on a pin 43 which is carried by a pair of opposing supports 44 and 45. The pin may pass through any pair of a plurality of pairs of holes 46 in the supports. The plate 40 is held in horizontal position by means of a bell crank 50, the lower arm 51 of which is adapted to overlie the arm 41. The bell crank is pivotally secured by means of a pin 52 to a bracket 53. The bracket is carried on supports 44 and 45 by suitable bolts, one of which serves as the pin 43. The holes 46 in the supports permit the plate 40 to be set at a plurality of points within the chute so as to vary the volume of the chute above the plate for a given quantity of feed. The bracket 53 is correspondingly moved with the plate 40 so as to maintain the cooperation between the bell crank and the arm 41.

The upper arm 54 of the bell crank 50 may be connected to the corresponding arms of the other stations by means of a cord 55 or pull rods, etc. The cord is accessible to an operator at a single point, preferably in the silo room where the switch for the silo dispenser is generally located. When the stations are being loaded by the conveyor, the cord is pulled taut so as to close each of the plates 40 and is secured in any suitable manner as by peg 56. When each of the stations is loaded, the cord is released and thus all dump at once. Though the weight of the feed is usually sufficient to effect dumping, in some cases a weight 57 may be fastened to the plate. Obviously, a trigger arrangement could be used at each station where the load is too great for a single cord. Any excess feed in the conveyor after the stations are filled is carried back to the silos.

At each silo there is provided in conjunction with the conveyor a discharge hopper 60 which receives through an opening 61 in the trough 17 any such excess feed. The discharge hopper is preferably made as a section of hopper 25 by partition 62. This excess feed falls into the hopper 60 and remains there so long as a slide valve 63 remains closed. The empty conveyor moves past the opening and then vertically downward to the base of hopper 25. The hopper tapers toward the bottom so that at the base it is the width of the trough. If it is desired to utilize the material collected in the hopper 60, it is only necessary to open slide valve 63 and the movement of the conveyor will draw the feed in hopper 60 into the hopper 25, and thence into the conveyor trough. This particular feature of my system permits running my conveyor clean of one type of feed such as that, for example, carried in silo 2, so that I may then place into the system the type of feed contained in silo 3. A slide valve 64 is provided for the hopper 60 so that when supplying the conveyor from one silo, the material will be carried by the other silo without being discharged. In this regard, I may provide one or more of my paddles with suitable bristles or other material which frictionally engage the bottom of the trough for sweeping the same.

When two different feeds are to be fed simultaneously, I provide a second plate 40' in one chute with the accompanying means for operating the same. This means is similar in all respects to the mechanism described above for plate 40 and is illustrated diagrammatically in Figs. 2, 3, and 4, including arm 41' and bell crank 50' carried by bracket 53'. The bell cranks 50' are connected by a cord 55' and operate in the same manner as cranks 50. Thus, as illustrated in Fig. 2, some chutes may have one plate and other chutes more than one. This multiple plate arrangement may also be used where two different feeds to be fed require different volumes, as, for example, silage and grain. In this case, the plate giving the required volume for silage is first closed prior to loading, and after dumping, the other plate for grain is closed. This saves the trouble of resetting the plates to adjust for the different required volume of the second feed.

Referring now to the details of my conveyor, the trough 17, which is supported by the lower arm 70 of the wall bracket 7, is preferably semi-circular in section and preferably made of sheet metal. Above the trough the cable housing 20 is supported by an upper arm 71 of the bracket, as by soldering. The cable housing 20 is preferably a tubular member made of sheet metal having a longitudinal slot 72 therein extending its entire length. The slot is of such a width that in section the periphery of the cable housing subtends an arc more than 180°. By this construction, the cable may be slidably maintained in the housing so as to support the paddles in the trough.

The paddles are held in position on the cable by a plurality of eyebolts 73 which are threaded on the cable and secured in fixed nonrotated position by clamps 74. The outside diameter of the eyebolts are such that they closely fit the walls of the housing so as to slidably pass through along with the cable. The paddles depend therefrom by means of a bracket 75 secured to the paddles by suitable means. The bracket is held in position on the threaded shank of the eyebolt by nuts 76. The clamps 74 comprise a tapered sleeve 80 having a flange 81 on one end thereof. A ring 82 is adapted to fit over the opposite end of the sleeve. The sleeve fits between the eyebolt 73 and the cable and due to the taper is adapted to be wedged therebetween so as to secure the eyebolt and the cable in fixed relation. The ring is then inserted on the unflanged end of the sleeve and serves to cooperate with the flange 81 to maintain the eyebolt on the sleeve. Both the sleeve and the ring are split so it is not necessary to thread them on the cable. The two halves of the ring are held together by set screws 83 which also serve to clamp the sleeve on to the cable as well as the ring on to the sleeve.

This preferred structure of my conveyor is believed to be novel and particularly advantageous in my system since it permits the conveyor to travel in all directions, thus allowing it to move upward and downward at sharp angles when providing head room such as is required when it goes from one side of the barn to the other, or when it goes down into and out of the loading hopper 25. Furthermore, this particular conveyor is extremely economical to manufacture, thus making my conveyor system more available to the average dairy farmer whose operations would not justify elaborate conveyors of the prior art.

In the operation of my improved system, the farmer or operator first opens the slide valves 32 in those discharge stations which he intends to use and closes the valves in stations not being used. At the same time he sets the plates 40 within the stations so that the volume above the plates within the chute is proper to measure the amount of feed he intends to discharge at any one of the particular stations. Having done this, the cord 55 is pulled and fastened on pin 56 closing all the plates. Slide valve 64 is closed in the hopper associated with silo 3 while the valve 64 in the other hopper is open. The valves 63 are closed. Next the conveyor 6 and the silo dispenser 13 in silo 2, for example, are started by operating appropriate switches (not shown). The feed comes out of the silo and falls into hopper 25. The conveyor picks the feed up and carries it to the first station. It falls into the chute 30 until the space above plate 40 is filled. The feed in the conveyor is then dragged to the next station. This process repeats itself until all the stations are filled. The dispenser is then shut off. The conveyor continues to operate until all the excess feed in hopper 25 and the trough is discharged in the hopper 60. Now the operator releases the cord 55 and the measured quantity of feed from silo 2 in each of the stations, is dumped in the mangers. The operator now closes the plates 40' by cord 55' in those stations having a second set and repeats the same procedure for dispensing feed from silo 3 being sure that slide valve 61 in hopper 69 of silo 2 is closed.

Where the operator wishes to feed the two types together, both plates 40 and 40' are closed by their respective cords 55 and 55'. The plate 40' is positioned so that the volume above it represents the combined volume of the feeds. When one type of feed has been distributed as described above, the plates 40 are dumped, but plates 40' are not. Then the second feed is distributed. Obviously the remaining space in each chute is the proper volume for the second feed, thus when distribution is complete and the plate 40' is dumped, a mixture of feed falls into the manger.

It is to be understood that various other forms and modifications of apparatus within the scope of my invention will occur to those skilled in the art, as for example, the use of the same in handling three or four types of feed. Consequently, no limitations are intended by the above description except as are contained in the following claims.

I claim:

1. A mechanical feeding system comprising a feed hopper, an endless conveyor adapted to move feed upwardly from said hopper, a plurality of feeding stations at longitudinally spaced points below said conveyor, means in the floor of said conveyor whereby feed is discharged therefrom at the feeding stations, each feeding station including a chute and trap door, whereby a predetermined volume of feed is accumulated in said stations, an accumulation hopper in the circuit of said conveyor and below the normal travel of said conveyor to accumulate undistributed feed, a common wall between said accumulation hopper and said feed hopper and port means in said wall for transferring undistributed feed from the accumulation hopper to the feed hopper.

2. In a mechanical feeding system including a storage hopper and a conveyor for transporting feed from said hopper to a plurality of feeding stations, the improvement which comprises a plurality of chutes secured to and depending from said conveyor, each of said chutes containing a valve means which comprises a plate of similar configuration to the cross section of said chute and of such a size as to prevent the passage of feed when said plate extends across said chute, an arm secured to said plate extending outside the chute through a longitudinal slot therein, a pair of flange members secured to said chute in cooperating relationship adjacent the edge of the slot, said flange members including a plurality of cooperating holes, a pin passing through said arm and secured in a pair of cooperating holes in said flange members, a bracket secured on at least one of said flange members, a bell crank pivotally mounted on said bracket, said bracket being positioned so that the lower arm of said bell crank overlies said arm, the balance of said plate and said lower arm being such that said plate normally tends towards an open position, and means on the upper arm of said bell crank whereby said plate is held in closed position by said lower arm.

3. In combination, an endless conveyor, a plurality of feed storage hoppers adapted to discharge separately into said conveyor, a plurality of feed distributing stations associated with said conveyor, dual valve means within each of said stations whereby upper and lower segregated portions of feed from said hoppers may be measured and retained therein whereby said stations are progressively filled to capacity, receiving hopper means for accumulating excess feed from said conveyor before supplying another type of feed to said conveyor, an inlet port for said receiving hopper means in the path of said conveyor, slide valve means controlling said port, and means for remotely discharging the combined portions from all of the feed stations simultaneously.

NAT CORDIS.

REFERENCES CITED

The following references are of record in the file of this patent:

UNITED STATES PATENTS

| Number | Name | Date |
|---|---|---|
| 457,321 | Kinzer | Aug. 4, 1891 |
| 1,162,221 | Caven | Nov. 30, 1915 |
| 1,269,013 | Smiley | June 11, 1918 |
| 1,321,811 | Dellenbach | Nov. 18, 1919 |
| 2,311,747 | Gooch | Feb. 23, 1943 |

FOREIGN PATENTS

| Number | Country | Date |
|---|---|---|
| 480,274 | Germany | July 31, 1929 |
| 588,808 | Germany | Nov. 28, 1933 |